US007220329B2

(12) United States Patent
Fox, Jr. et al.

(10) Patent No.: US 7,220,329 B2
(45) Date of Patent: May 22, 2007

(54) METHOD FOR APPLYING REFERENCE MARKINGS TO WALLBOARD DURING MANUFACTURE

(75) Inventors: William R Fox, Jr., Tampa, FL (US); Melissa S Merfeld, Fort Mill, SC (US)

(73) Assignee: National Gypsum Properties, LLC, Charlotte, NC (US)

( * ) Notice: Subject to any disclaimer, the term of this patent is extended or adjusted under 35 U.S.C. 154(b) by 0 days.

(21) Appl. No.: 10/393,079

(22) Filed: Mar. 20, 2003

(65) Prior Publication Data

US 2004/0182272 A1 Sep. 23, 2004

(51) Int. Cl.

*B32B 13/08* (2006.01)
*B32B 37/02* (2006.01)
*B41J 3/00* (2006.01)
*B41J 25/308* (2006.01)

(52) U.S. Cl. ............................ 156/39; 156/40; 156/44

(58) Field of Classification Search .................. 156/39, 156/40, 44, 346, 348, 277; 52/105; 33/1 B; 347/104

See application file for complete search history.

(56) References Cited

U.S. PATENT DOCUMENTS

| | | | | |
|---|---|---|---|---|
| 1,859,853 | A * | 5/1932 | Thomson | 156/39 |
| 2,270,419 | A | 1/1942 | Debo | |
| 3,462,341 | A * | 8/1969 | Littin | 156/42 |
| 4,442,152 | A | 4/1984 | Kirk | |
| 4,571,601 | A | 2/1986 | Teshima | |
| 4,579,610 | A * | 4/1986 | Kole et al. | 156/44 |
| 4,686,540 | A | 8/1987 | Leslie et al. | |
| 4,739,415 | A | 4/1988 | Toyono et al. | |
| 4,764,880 | A | 8/1988 | Pearl | |
| 4,858,402 | A | 8/1989 | Putz | 52/105 |
| 4,870,788 | A | 10/1989 | Hassan | 52/105 |
| 4,879,949 | A * | 11/1989 | Vennike | 101/157 |
| 4,916,819 | A | 4/1990 | Gerber | |
| 4,924,644 | A | 5/1990 | Lewis | |
| 4,927,696 | A | 5/1990 | Berg | 428/195 |
| 5,083,143 | A | 1/1992 | Hoffman | |
| 5,707,689 | A | 1/1998 | Hori | |
| 5,718,797 | A | 2/1998 | Phillips et al. | 156/346 |
| 5,749,551 | A | 5/1998 | Torres et al. | |
| 5,879,446 | A | 3/1999 | Patel et al. | 106/781 |
| 5,950,319 | A | 9/1999 | Harris | 33/494 |
| 6,012,225 | A | 1/2000 | Grabbe | 29/843 |
| 6,012,255 | A * | 1/2000 | Smid et al. | 52/105 |

(Continued)

FOREIGN PATENT DOCUMENTS

WO WO 99/57371 * 11/1999

*Primary Examiner*—Steven D. Maki
(74) *Attorney, Agent, or Firm*—Ice Miller LLP

(57) ABSTRACT

An apparatus and method for applying reference or grid markings to wallboard during the manufacturing process is disclosed. Reference or grid markings are applied to one sheet of cover paper at a location between the originating cover paper rolls and the cover paper creaser or creasers. This is accomplished by locating and aligning multiple print heads across the width of the continuously passing cover paper, such that markings are ejected onto the cover paper in a specific and coordinated fashion. In addition to using any suitable commercially-available computer equipment to coordinate printer head activity, this function is accomplished by attaching each print head to a common horizontal support element and provide individual adjustments that are perpendicular to, and with the directional flow of the passing cover paper.

19 Claims, 5 Drawing Sheets

U.S. PATENT DOCUMENTS 6,045,730 A * 4/2000 Potter .......................... 156/39
6,082,018 A 7/2000 Wells
6,083,571 A 7/2000 Kapfinger
6,164,753 A 12/2000 Maza et al.
6,361,134 B1 3/2002 Galan et al.
6,412,992 B2 * 7/2002 Mogi ......................... 400/579
6,467,174 B1 10/2002 Kotori
6,634,729 B1 10/2003 Schuman et al.
6,760,978 B2 7/2004 Gleeson
6,880,229 B2 4/2005 Zepp et al.
2002/0098025 A1 * 7/2002 Lee et al. ..................... 400/55
2003/0079431 A1 * 5/2003 Schuman et al. ........ 52/506.01
2004/0101673 A1 5/2004 Schoppman
2005/0172416 A1 8/2005 Feliciano

* cited by examiner

METHOD FOR APPLYING REFERENCE MARKINGS TO WALLBOARD DURING MANUFACTURE

BACKGROUND OF THE INVENTION

1. Field of the Invention

The present invention relates generally to an apparatus and method for manufacturing wallboard, and more specifically to an apparatus and method for applying reference markings to wallboard during the manufacturing process.

2. Description of the Related Art

Gypsum board is well known and widely used in the construction industry as a convenient way to construct walls, barriers and other structural formations. The use of inorganic gypsum board, which is also commonly known as "wallboard" or "drywall," is often desirable over more expensive and time consuming conventional wet plaster methods. A typical sheet of wallboard comprises a gypsum core, a back cover sheet on one surface of the core and a face or front cover sheet on the other core surface. One cover sheet is typically folded around the long side edges of the core and overlaps the side edges of the other cover sheet. Apparatuses and methods for the commercial manufacture of wallboard are well known, and instances of such apparatuses and methods can be found, for example, in Kirk-Othmer, Encyclopedia of Chemical Technology, Second Edition, 1970, Vol. 21, pages 621–24, which is incorporated herein by reference. Other examples can also be found in U.S. Pat. Nos. 5,718,797 and 5,879,446, both of which are commonly assigned to the assignee of the present application, and both of which are incorporated herein by reference in their entireties.

Like similar building components make of other materials, gypsum wallboard is normally manufactured into and commercially sold in relatively large standardized sizes, such as 48 inches by 96 inches, 48 inches by 120 inches, 48 inches by 144 inches, and so forth. This wallboard is typically attached to studs, joists, rafters or other types of building supports by use of nails, screws or other types of fasteners. Although some wallboards may be placed and fastened in their entirety, others must be cut to the required size, and both whole and cut boards are typically marked to indicate fixing points for receiving fasteners such as nails or screws.

During construction, a worker typically translates actual measurements of the intended installation to the location and materials at hand, as there are usually sufficiently material deviations in installation techniques and site variances such that reliance on blueprints or drawings for accurately trimming and marking materials is not practical. In practice, construction workers continually measure and mark both materials and target installation sites for the purpose of achieving proper fit, locations for fixing materials, and utilization of wallboard material. The measuring and marking work required for this purpose can be detailed and time-consuming and must be carried out with reasonable care. Such measuring and marking can result in delays in the work, especially when errors are involved, and can result in the use of more wallboard than should be required for a particular job. Such a waste in construction materials is undesirable. In addition, because labor is typically one of the costliest components in construction, excess time or any time needed for such measuring and marking work is particularly undesirable.

Accordingly, there exists a need for wallboard that is fabricated with existing reference markings in a way that is generally useful for construction workers. Such a need has been addressed to some degree, such as by, for example, U.S. Pat. Nos. 4,858,402; 4,870,788; 4,927,696; 5,950,319 and 6,012,255, all of which are incorporated herein by reference in their entireties. Each of these references discusses various needs and solutions for reference or grid markings on wallboard or like construction materials, and each discusses various methods of implementation and use for their solutions. Only one of these references, however, actually refers to a method or apparatus for applying such markings to a wallboard; and this reference, U.S. Pat. No. 4,858,402, only briefly discusses a "marking roller" that crudely applies markings after a wallboard has already been made.

In fact, while many different types of lines, patterns and markings may be desirable, the actual application of markings to wallboard is not trivial. Commercial manufacture of gypsum wallboard is often accomplished by processes that are capable of operation under continuous high speed conditions. Generally, wallboard is conventionally produced by sandwiching a core of aqueous "slurry" or paste of calcined gypsum and other materials between two extremely long and continuous sheets of board cover paper. Various types of cover paper are known in the art, and all such types can be used for this purpose. This cover paper is typically creased during an automated process to form the sides of the wallboard just before it meets with the slurry. After the gypsum slurry has set (i.e., reacted with the water from the aqueous slurry) for a period of time, the resulting extremely long board is then cut into manageable sections. These sections are then fully dried in heating kilns and the finished product becomes a strong, rigid, fire-resistant building material, which is then cut into various board sizes as desired. Cut boards of like sizes are then bundled into large stacks which are then sold and shipped to various wholesale or retail entities.

The foregoing manufacturing process does not naturally lend itself to the application of a "marking roller" or another like marking material. As an initial matter, the marking of wet wallboard is entirely impractical. Furthermore, pre-marking of the very large rolls of cover paper used in a conventional manufacturing process is problematic for a number of reasons. Firstly, cover paper can tend to expand and contract slightly from the time it is pre-marked up until the time that it actually meets the slurry. Secondly, the creaser elements in most manufacturing processes have some degree of flexibility to them, which results in cover paper not being creased in exactly the same location throughout the manufacturing process. In addition, if any pre-marked lines happen to be slightly offset for whatever reason, there exists no convenient way to correct for this offset in conventional wallboard manufacturing systems.

Accordingly, the markings discussed in the references listed above tend to be made by unbundling shipped stacks of wallboards and then marking them as desired. Alternatively, markings could possibly be applied between the heating kiln and bundling stages for wallboard manufactured by a commercial manufacturing process, although such a process typically does not allow for the space, time and labor that would be required for such an operation. As can be readily understood, both an unbundling and marking technique and a kiln-marking-bundling technique incorporate a substantial amount of additional time and effort than is typically required in the manufacture of wallboard. Furthermore, neither technique provides a method for marking wallboard during the actual manufacturing process, as this process has technically ended after the kiln and cutting stages. While they are thus serviceable due to the desirable resulting product, both of these potential marking techniques are largely inefficient ways for providing reference markings on wallboard.

Accordingly, there exists a need for an apparatus and method for applying reference or grid markings to wallboard during the manufacturing process, and in particular for such an apparatus and method to be capable of being incorporated into a wallboard manufacturing process with minimal adaptation or alteration to such a process.

SUMMARY

It is an advantage of the present invention to provide an apparatus and method for applying reference markings to wallboard during the manufacturing process. According to one embodiment of the present invention, the provided apparatus and method involve applying reference markings to one sheet of cover paper at a location between the originating cover paper rolls and the cover paper creaser or creasers. This can be accomplished by locating and aligning multiple print heads across the width of the continuously passing cover paper, such that markings are ejected onto the cover paper in a specific and coordinated fashion. In addition to using any suitable commercially-available computer equipment to coordinate printer head activity, this function can be accomplished by rotatably attaching each print head to a common horizontal support bar and adjusting the horizontal and rotated location of each print head as needed.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures for the disclosed inventive apparatus and method. These drawings in no way limit any changes in form and detail that may be made to the invention by one skilled in the art without departing from the spirit and scope of the invention.

DETAILED DESCRIPTION

An example application of a system and method according to the invention is this section. This example is being provided solely to add context and aid in the understanding of the invention. Other applications are possible, such that this example should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

One advantage of the present invention is a reduction in the amount of labor required for installing wallboard and in the amount of wallboard that must be scrapped or otherwise wasted due to inefficient manual measuring techniques. This advantage is accomplished through the manufacture of wallboard that contains useful reference markings at common distances both horizontally and vertically across the wallboard.

Another advantage of the present invention is the ability to apply these reference markings to the wallboard during the manufacturing process itself, such that the drawbacks of pre-marking cover paper or marking wallboard after it has been manufactured can be avoided. Accordingly, those practicing the invention are provided the opportunity to implement the inventive processes described herein as fully automated or, alternatively, may elect to have varying levels of manual operator participation and/or intervention.

Modern technologies such as computers, processors, automated systems and the like offer new opportunities for manufacturers to produce products more rapidly and efficiently. The present invention provides an apparatus and method for applying reference or grid markings to wallboard during the manufacturing process itself. Reference or grid markings are preferably applied to one sheet of cover paper at a location between the originating cover paper rolls and the cover paper creaser or creasers. This is accomplished by locating and aligning a plurality of print heads across the width of the continuously passing cover paper, such that markings are ejected onto the cover paper in a specific and coordinated fashion. In addition to using any suitable commercially-available computer equipment to coordinate printer head activity, this function is accomplished by attaching each print head to a common horizontal support bar and adjusting the horizontal and rotated location of each print head as needed.

Figure 1:
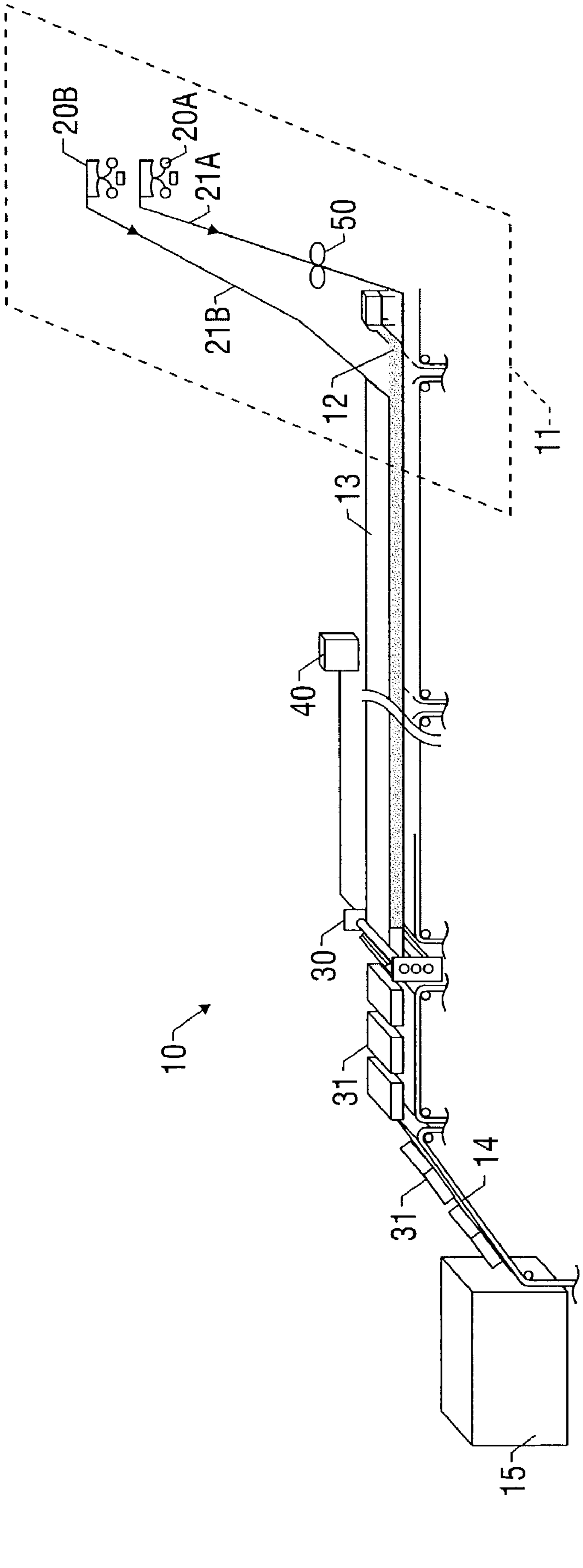
FIG. 1 illustrates an exemplary system for the commercial manufacture of wallboard.

Referencing FIG. 1, an exemplary system 10 for the commercial manufacture of wallboard is illustrated. At a wetend region 11 of this system 10, two configurations 20A and 20B for supplying two continuous streams of cover paper can be seen. Although dimensions may vary, this continuously-supplied cover paper is typically four to five feet in width, but preferably 48 inches, and is supplied continuously from huge rolls having a diameter of four to; six feet or more. A bottom cover paper 21A is supplied by a bottom cover paper supply configuration 20A comprising two large spindles, each capable of supporting one huge roll of cover paper. A top cover paper 21B is supplied by a separate top cover paper supply configuration 20B, which configuration is substantially similar to the configuration 20A for the bottom cover paper.

As the bottom cover paper 21A leaves its point of origin at configuration 20A, it travels along a conveyor, roller, belt or other like system to a point where its edges are upturned at substantially right angles with respect to the otherwise horizontally oriented bottom cover paper. Methods and devices for creating such upturned edges on cover paper on the fly are well known in the art, and any such methods and devices for performing this function may be utilized in practicing the present invention. One device commonly used for performing this function is a creaser 50, operation of which will be generally understood by one skilled in the art. A slurry 12 of wet calcined gypsum and other materials is then continuously deposited on the moving continuous sheet of bottom cover paper 21A at a given location, which is preferably after the edges on the bottom cover paper have been upturned by the creaser 50 to form a shallow trough for receiving and containing the slurry. The slurry 12 quickly settles and evens out within the moving bottom cover paper 21A due to the liquid state of the slurry and the ongoing forward motion of the bottom cover paper.

At some distance after the slurry 12 has been deposited onto the bottom cover paper 21A, the top cover paper 21B is directed into place atop the wet slurry and bottom cover paper, thereby forming a "sandwich" of slurry within sheets of cover paper. As in the case of the bottom cover paper, the top cover paper leaves its point of origin at configuration 20B and travels along a similar but separate conveyor, roller, belt or other like system until it is directed into place atop the slurry and bottom cover paper. A "wet" wallboard is thus formed at this point, and several minutes are generally required until the wet wallboard has set sufficiently such that it can be cut and dried further. Because the manufacturing process would be considerably slowed by allowing this newly formed "wet" wallboard to sit in place while it sets for cutting, this newly formed wallboard is thus continually moved forward on a "board line" 13 so that new wet wallboard can continue to be made while setting occurs. This board line 13 can extend for hundreds or thousands of feet before cutting.

Again referencing FIG. 1, a cutting mechanism such as a rotary knife 30 is located at the end of the board line 13 and is used to cut the now-set wallboard into smaller and more manageable sections 31. This rotary knife 30 is preferably controlled by or at least receives information from a control system 40 that is capable of measuring various parameters, assisting in the optimal placement of cover paper splices, and adjusting the timing of the knife cuts as necessary to isolate selected defects such as cover paper splices. After this initial cutting of the wallboard by the rotary knife 30, the cut wallboard sections 31 are then placed onto a separate conveyor or roller system 14 by manual or automated means so that they can be processed through heating kilns 15 or any other appropriate device for fully hardening and drying wallboard. Once these wallboard sections are sufficiently dried and hardened by the drying kilns or other drying device, they can then be further cut, bundled, packaged and processed in accordance with the desires of the manufacturer and the needs of consumers, through standard methods that are readily known to those skilled in the art.

Figure 2:
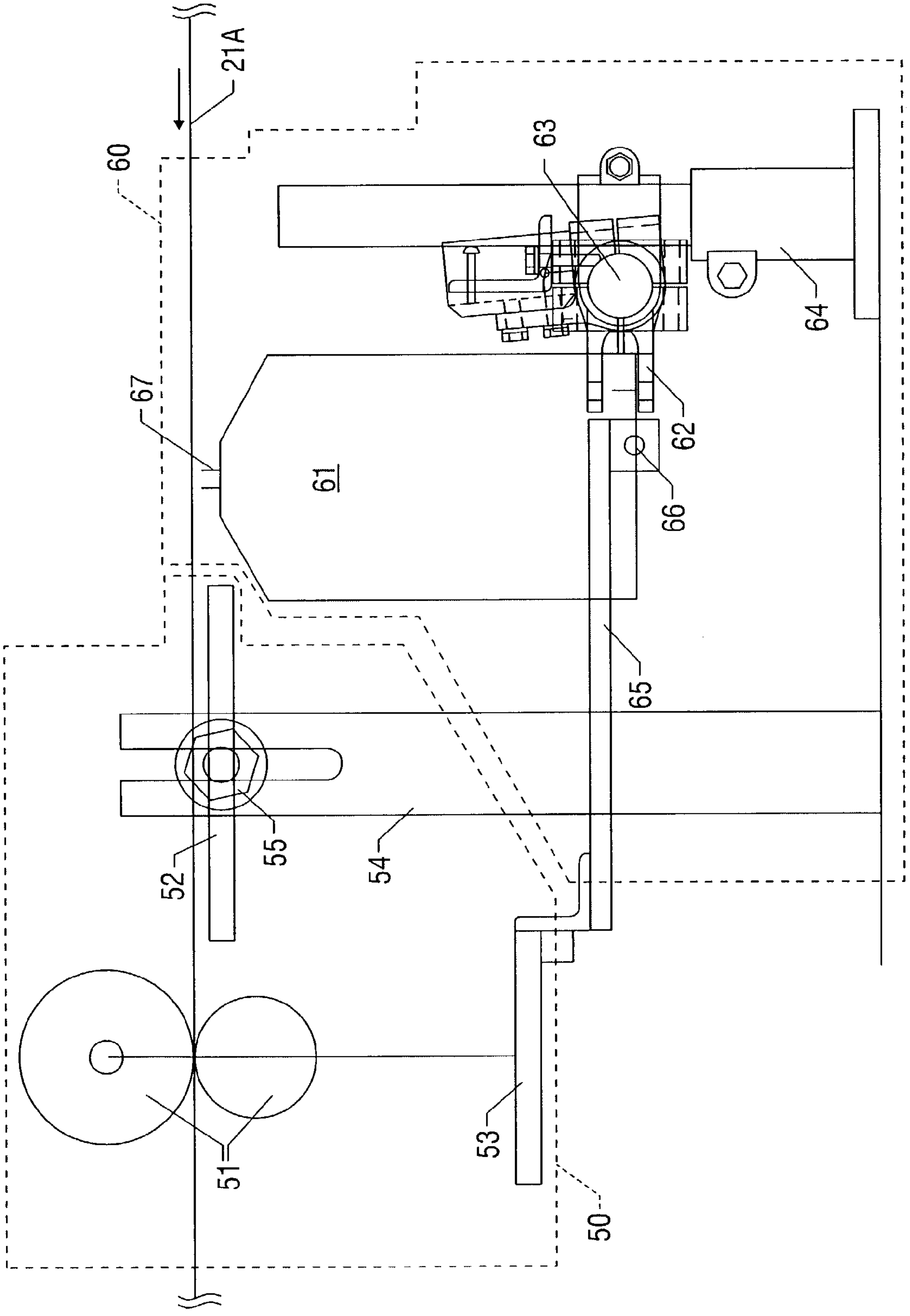
FIG. 2 illustrates in side cross-sectional view an example of a sheet of cover paper passing by a plurality of marking and creasing elements according to one embodiment of the present invention.

Turning now to FIG. 2, a side cross-sectional view of a sheet of cover paper passing by a plurality of marking and creasing elements according to one embodiment of the present invention is illustrated. For ease of illustration, references here will be made only with respect to bottom cover paper 21A, with it being understood that these or similar details with respect to creasing and/or marking can be applied to the top cover paper as well. As previously discussed, cover paper is preferably creased (i.e. has its edges upturned) before it meets with a slurry in the process of forming wallboard. Such an operation is preferably performed by a creaser 50, which generally comprises, inter alia, creaser wheels 51 that operate in conjunction with one or more paper guide plates 52 and one or more inside scores and/or adjuster plates 53.

The paper guide plate 52 generally serves to guide the continuously-moving cover paper 21A to an appropriate vertical position prior to its passing through the creaser wheels 51. This paper guide plate is preferably at least the width of the passing cover paper, and it is particularly preferable for the width of the paper guide plate to exceed the width of the passing cover paper by some nominal amount. The paper guide plate is preferably mounted to one or more paper guide plate supports 54 by an adjusting attachment mechanism 55, such as a sliding nut and bolt arrangement, as illustrated in FIG. 2. This adjusting attachment mechanism then permits the orientation and level of the paper guide plate to be adjusted according to the orientation and level of the creaser wheels, such that the passing cover paper can enter the creaser wheels at an optimum orientation and level.

The inside score and/or adjuster plate 53 generally serves to provide a reference for the location of the passing cover paper relative to the creaser wheels 51. As discussed previously, the commercial manufacture of gypsum wallboard is often accomplished under continuous high speed conditions, with continuous sheets of cover paper passing through numerous guides, belts, rollers-and/or the like. However, while the vertical location of these sheets of cover paper tends to remain relatively stable according to the settings of such guides, belts and/or rollers, the relative side-to-side position of these sheets of cover paper can vary over time from the paper source to the location where both sheets of cover paper and slurry meet. These variances are generally tracked by said inside score and/or adjuster plate 53, as this element is designed to shift horizontally from side to side along with the cover paper whenever the cover paper shifts horizontally from side to side during the manufacturing process. For illustrative purposes, these related horizontal side to side shiftings by both the cover paper 21A and the inside score and/or adjuster plate 53 occur substantially along axes directly perpendicular to the side cross-sectional view presented by FIG. 2 (i.e. into and out of the illustration).

Again referencing FIG. 2, a printing apparatus 60 is preferably provided at a location in the manufacturing process just prior to the creaser 50. This printing apparatus generally comprises, inter alia, one or more printing devices 61 connected to one or more mounting units 62, which are in turn connected to a horizontal element 63 that generally traverses the cover paper 21A horizontally (i.e. into and out of the illustration) at some distance from the cover paper as the cover paper passes. In a preferred embodiment, said one or more printing devices comprise one or more print heads, with the functionality of said print heads being controlled by a printing control unit, as discussed in greater detail below. In a particularly preferred embodiment, five print heads are provided at designated intervals along horizontal element 63, as also discussed in greater detail below. Said one or more mounting units preferably comprise brackets adapted for specific functionalities, as described in greater detail below, while said horizontal element 63 comprises a support bar capable of both rotating and shifting horizontally. Horizontal element 63 is generally connected to and supported by one or more vertical supports 64, which may comprise stanchions or other like supports, as would be readily understood by one skilled in the art.

A follower arm 65 is connected to the inside score and/or adjuster plate 53, such that this follower arm moves horizontally from side-to-side in sync with the inside score and/or adjuster plate when that element does so. Follower arm 65 is also preferably connected to one or more printing devices 61 and/or one or more mounting units 62 via connecting means 66, which can be, for example, a threaded connecting rod, cam, dowel, or any other suitable means for connecting the follower arm to said one or more printing devices either directly or indirectly. In this manner, any horizontal shifting of the passing cover paper is translated via the inside score and/or adjuster plate 53 through the follower arm 65 and then to said one or more printing devices 61. Accordingly, the alignment of said one or more printing devices with the passing cover paper will not be affected if the cover paper shifts horizontally from side to side, as typically occurs from time to time during a conventional wallboard manufacturing process. Alternatively, follower arm 65 may also be connected to horizontal element 63 either directly or indirectly via one or more additional mounting units 62, or may likewise be connected to any other suitable element that will allow the follower arm to aid in translating the horizontal shifts of the passing cover paper to said one or more printing devices, such connection as would be readily understood by one skilled in the art.

Figure 3:
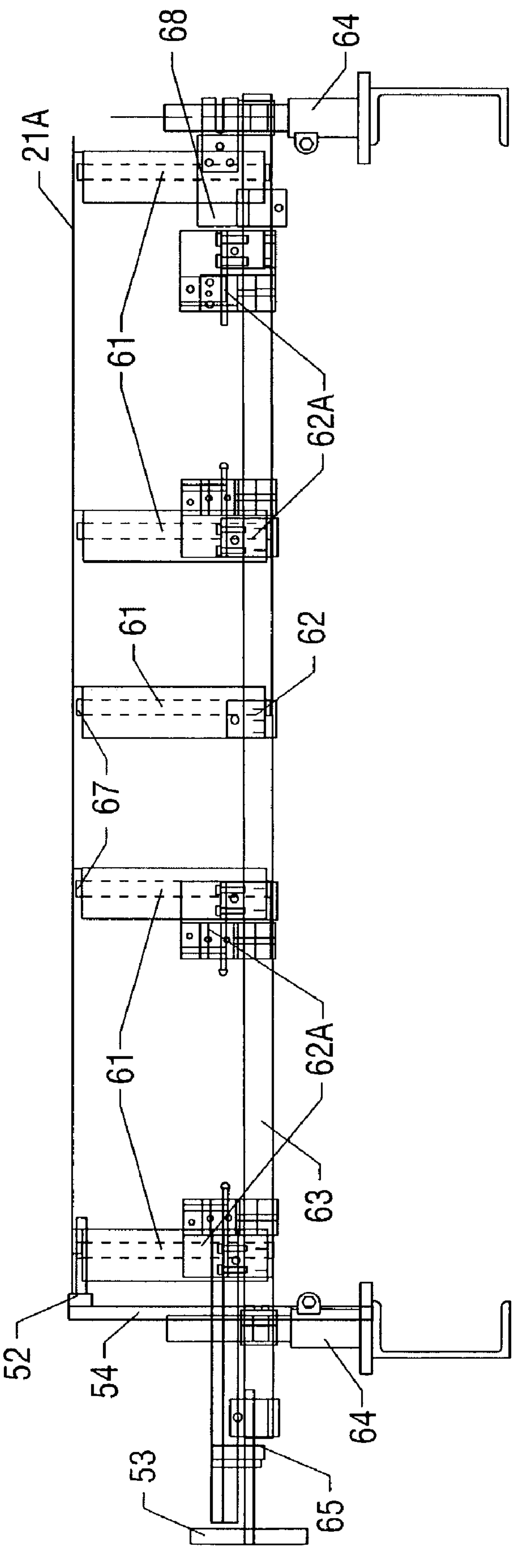
FIG. 3 illustrates in front cross-sectional view the example depicted in FIG. 2 of a sheet of cover paper passing by a plurality of marking and creasing elements according to one embodiment of the present invention.

Turning now to FIG. 3, a front cross-sectional view of the example depicted in FIG. 2 of a sheet of cover paper passing by a plurality of marking and creasing elements according to one embodiment of the present invention is illustrated. As illustrated in FIG. 3, the width of cover paper 21A is about 48 inches, and the direction of travel of this 48 inches-wide continuous sheet of cover paper is into the page. As referenced previously, one preferred embodiment of the present invention comprises a printing system including a plurality of print heads 61, each with one or more ink ejectors 67, and a computer control unit (not shown) for coordinating the printing activity of all print heads. Such a printing system comprising a computer control unit and multiple print heads is commercially available, for example, as the Diagraph IJ 3000 printing system manufactured and sold by Diagraph, a division of Illinois Tool Works of Glenview, Ill. According to a particularly preferred embodiment of the present invention, five print heads 61 are spaced and mounted at specific intervals along horizontal support assembly 63, such that the ink ejectors 67 of each print head are spaced a short but nominal distance beneath the cover paper 21A as it passes above the print heads. As will be readily understood by one skilled in the art, the optimum distance between any given set of print heads and the cover paper may vary slightly, and this distance may be set accordingly by altering the location of the cover paper, the print heads, or both.

While the horizontal support assembly 63 can preferably be rotated as a means for adjusting various elements and relationships in printing apparatus 60, it is generally preferable that this support assembly be stable during normal manufacturing operations. Accordingly, one or more standard slide plates 68 are provided for preventing such undesired rotation of the support assembly. Such a slide plate or slide plates are preferably attached to one or more of the vertical supports 64 via nails, screws, or other appropriate fastening means, and this slide plate or slide plates operates to block one or more elements rigidly attached to the horizontal assembly, such that its axial rotation is fixed at the desired point. Adjustments to the rotation of the horizontal mounting assembly may preferably be accomplished via routine adjustments to the location and position of said one or more slide plates, as would be readily understood by one skilled in the art.

Again referencing FIG. 3, a preferred horizontal spacing of these five print heads can be seen. One print head is optimally located at a central position such that its markings onto the cover paper are substantially down a center line of the paper. Two more print heads are located at end or "gutter" positions near the edges of the cover paper, such that their markings onto the cover paper are substantially near the edges of the cover paper and spaced away from the edges at some nominally desired distance. The final two print heads are advantageously spaced at like distances from the center print head, such that the markings from all five print heads may form a substantially symmetric pattern of marks along the continuously passing cover paper. Such a pattern is formed when each print head is preferably coordinated via the computer control unit to eject ink or otherwise print in unison, thereby creating five markings that are substantially in line each time ink is ejected. Of course, any type of marking material, such as ink or indelible ink e.g., known to one of ordinary skill in the art having the benefit of this disclosure could be utilized with the present invention.

In a particularly preferred embodiment, these print heads are arranged such that their markings are made in parallel lines near the edges of the cover paper, and at locations 16, 24 and 32 inches from either edge of the cover paper, as these are the distances presumed to be of greatest use to construction workers who work with and install wallboard. Each print head ejects ink only in controlled spurts, such that each marking may be less than an inch in both length and width, and it is particularly preferred that each marking in each line be 4 inches from the markings that precede and succeed it. In this manner, a set of markings that resemble the vertices of a grid are patterned onto the cover paper. It is contemplated that each individual marking may simply be a dot or short dash, or alternatively, a cross, character, or any other readily recognized symbol. It is further contemplated each mark could comprise a company's logo, or trademark, advertising, or a barcode, e.g.

In addition, although specific distances between print heads and markings and in the lengths and widths of markings have been given, it is specifically contemplated that these distances may be varied as desired, as the exact spacing between print heads and markings is not critical to the overall invention as disclosed herein. In fact, it is specifically contemplated that simple adjustments in the number of print heads used, the spacing of same, and/or the timing of ink ejections can result in the reproduction of one or more of the wallboard marking patterns disclosed by one or more of the prior art references discussed above.

Continuing with FIG. 3, a plurality of mounting units 62 and 62A can be seen. Such mounting units may comprise custom-designed mounting brackets, mounting brackets designed for and sold with commercial printing systems, such as those provided by Diagraph for its print heads or ones provided by Matthews International Corporation, other readily known mounting apparatuses as would be known to those skilled in the art, or a combination of one or more of the foregoing. For example, Diagraph manufactures and sells specific mounting brackets designed for use with its printing heads for use with its IJ 3000 printing system, and Matthews International Corporation of Pittsburgh, Pa. manufactures and sells mounting brackets for use with its DROP-ON-DEMAND™ ink-jet print heads in its R4 system. However, these mounting brackets do not provide the entire range of functionality required in a particularly preferred embodiment of the present invention. Accordingly, one or more additional mounting units are preferably used in conjunction with the mounting units that are already commercially provided by, for example, Diagraph or Matthews.

As illustrated in FIG. 3, it is sufficient for one print head to be mounted only by the mounting unit 62 provided by Diagraph or Matthews, and for purposes of illustration, this is the center print head in FIG. 3. As illustrated, however, each of the other four print heads are provided with additional structure in their modified mounting units 62A.

This complexity in mounting units arises primarily from a desire for flexibility and ease of adjustment for each print head in a preferred embodiment of the present invention. While such additions to mounting structure are not necessary, they do provide for the ability of each print head to be conveniently individually rotated and adjusted with respect to the horizontal support assembly 63 and the other print heads. Because many commercially provided mounting units only provide for a simple fastening to a support assembly or other support structure, however, the five print heads of the preferred embodiment disclosed herein would not ordinarily be individually adjustable with respect to the horizontal support and each other. Such adjustment, however, is desirable not only during installation, but periodically thereafter as the performance of each individual print head changes over time or is replaced. Hence, modifications to each mounting unit are preferably added to permit each individual print head to be rotated and adjusted as desired without requiring a full dismounting of the print head.

Figure 4:
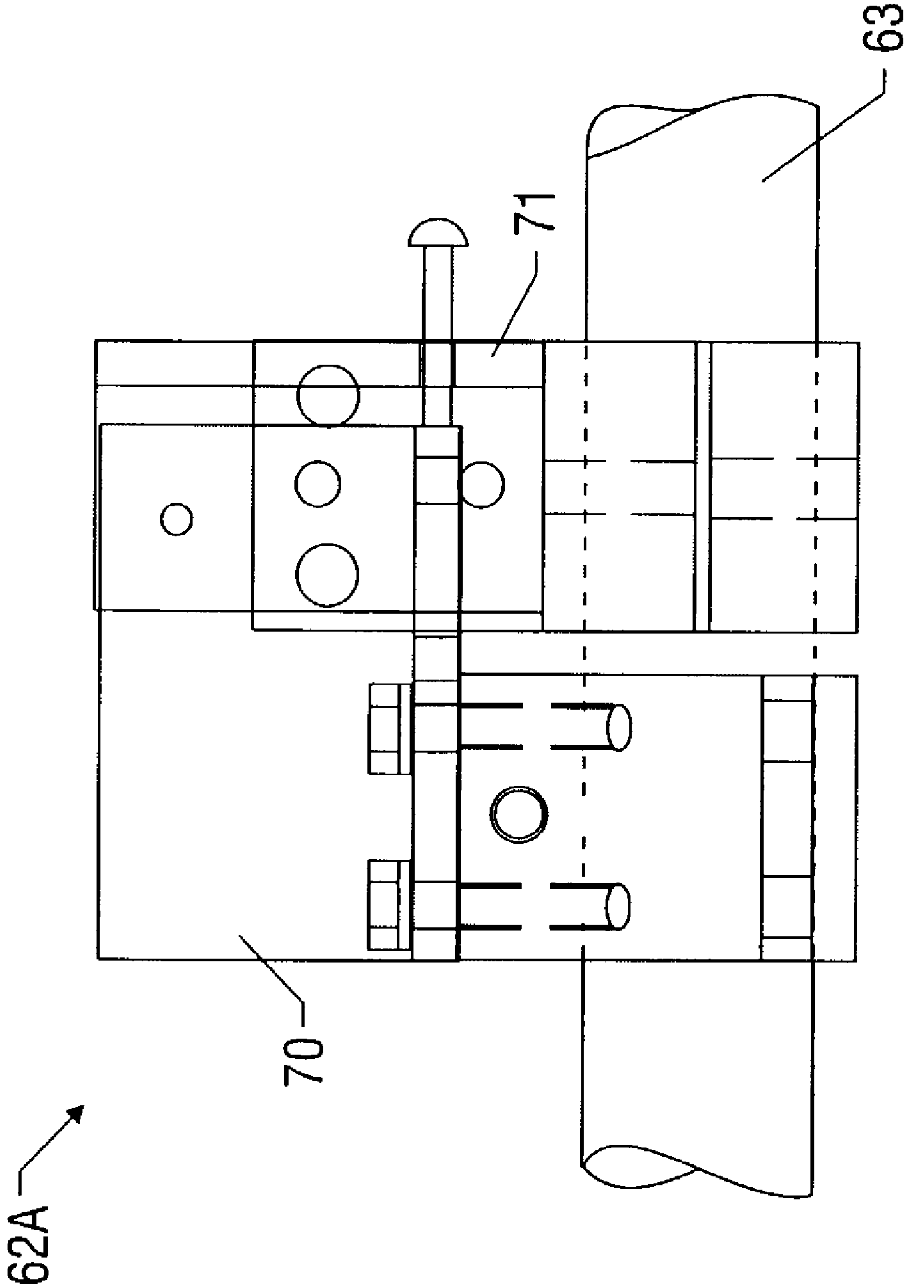
FIG. 4 illustrates in top cross-sectional view an example of a modified mounting unit with additional structure, as depicted in FIG. 3, according to one embodiment of the present invention.

Turning now to FIG. 4, a top cross-sectional view of an example of a modified mounting unit with additional structure, as depicted in FIG. 3, according to one embodiment of the present invention is provided. Modified mounting unit 62A comes with a mounting bracket 70 originally-provided Diagraph or Matthews, which is attached to a custom designed adjuster bracket 71 such that the horizontal support 63 passes through both brackets 70 and 71. Unlike the situation where only the Diagraph or Matthews standard mounting bracket 70 is utilized, however, the combined use of brackets 70 and 71 provides for the ability of a mounted print head (not illustrated) to be rotated about the horizontal support without dismounting it. This is accomplished by one of brackets 70 or 71 being firmly attached to the horizontal support 63, while the other of these brackets is firmly attached to the print head, with the attachment between mounting brackets being adjustable such that each bracket can rotate with respect to the other when a readily adjustable connector between the two is loosened. Such a connector can be a simple bolt and wing nut, or any other like connection, as would be readily understood by one skilled in the art.

Figure 5B:
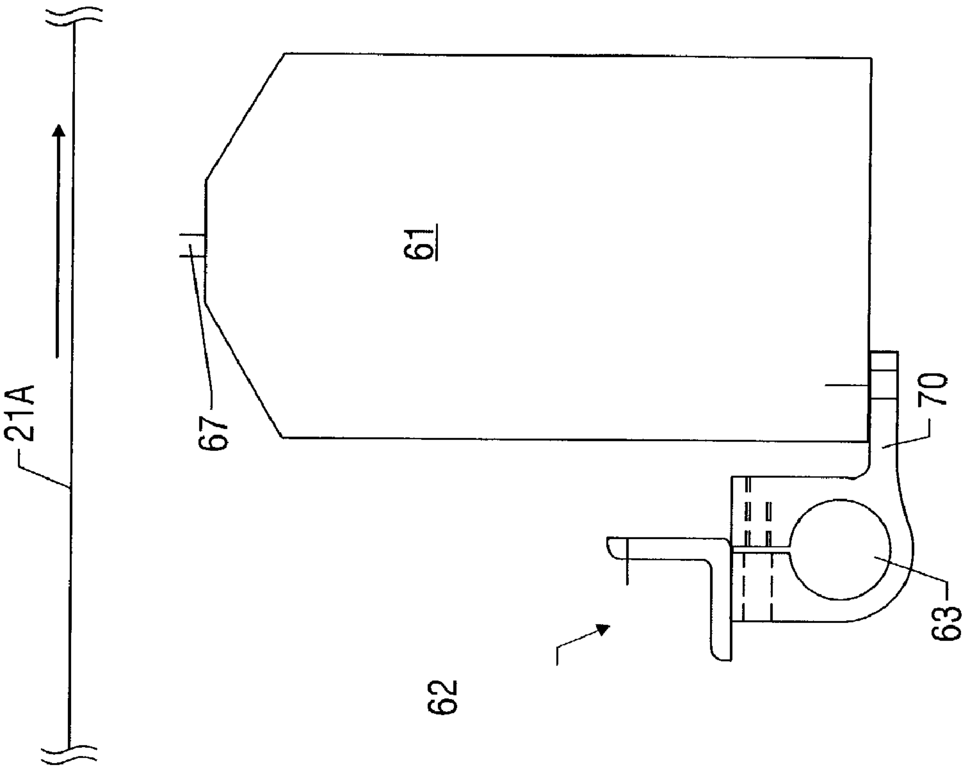
FIGS. 5A and 5B illustrate in side cross-sectional views examples of a modified mounting unit and a simple mounting unit relative to a horizontal support bar and print head according to one embodiment of the present invention.
Figure 5A:
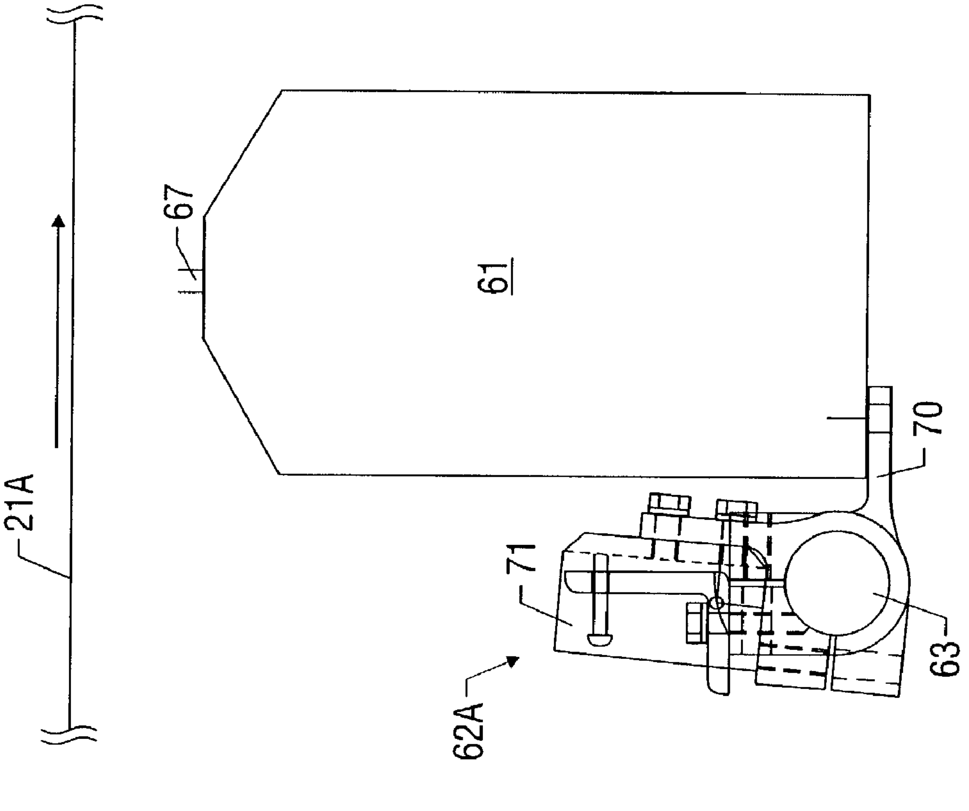

An additional perspective of the relationships between both brackets 70 and 71, the horizontal support and a print head is provided in FIGS. 5A and 5B. Both FIG. 5A and FIG. 5B are provided in side cross-sectional views, and FIG. 5A depicts a modified mounting unit 62A, while FIG. 5B depicts a Diagraph or Matthews-only standard mounting unit 62. As can be seen from FIGS. 4, 5A and 5B, a mounting unit 62 that only utilizes a standard mounting bracket 70 forces the mounting unit, and thus the print head, to become rigidly attached to the horizontal support 63, while a modified mounting unit 62A that also utilizes an adjuster bracket 71 readily permits the rotational orientation of the print head to be adjusted, even while the mounting unit 62A is rigidly attached to the support bar 63 and the print head 61.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method of manufacturing wallboard with markings thereon comprising the steps of:

passing a stream of substantially horizontally oriented cover paper from a cover paper source to a slurry source;

positioning at least one printing device on a horizontal element located in between the cover paper source and the slurry source so that the at least one printing device is aligned with the stream of cover paper;

connecting a follower arm to the horizontal element;

coupling the follower arm to the cover paper;

utilizing the at least one printing device to place marking material on the cover paper to make markings on the cover paper in an organized fashion as the stream of cover paper passes the at least one printing device on the cover paper's way to the slurry source;

continuously depositing a slurry from the slurry source onto the stream of cover paper; and shifting the position of the follower arm to correspond to any horizontal shift in the cover paper so that the follower arm causes an equal shift in the horizontal element and the at least one printing device as the cover paper passes by the at least one printing device to keep the at least one printing device aligned with the cover paper to make the markings in the organized fashion.

2. The method of claim 1 further comprising the step of upturning the cover paper's edges at substantially right angles with respect to the otherwise horizontally oriented cover paper, prior to the step of depositing the slurry onto the continuous stream of paper.

3. The method of claim 2 wherein the step of upturning the cover paper's edges is accomplished by utilizing a creaser.

4. The method of claim 3 further comprising the step of positioning the creaser in between the slurry source and the printing device.

5. The method of claim 2, wherein the at least one printing device is positioned just prior to the creaser.

6. The method of claim 1 further comprising the step of attaching each of the at least one printing devices to the horizontal element that traverses the cover paper, so that the location of each of the at least one printing devices can be adjusted horizontally and so that each of the at least one printing devices can be rotated about the horizontal element.

7. The method of claim 1 wherein the step of positioning the at least one printing device comprises positioning five printing devices.

8. The method of claim 7 wherein the step of utilizing the five printing devices to place marking material on the cover paper creates a pattern of marks that are located on each edge of the cover paper and 16 inches, 24 inches, and 32 inches from either edge of the cover paper.

9. The method of claim 1 wherein said marking material is ink.

10. The method of claim 1 wherein the passing of the stream of cover paper from the cover paper source to the slurry source comprises passing a stream of bottom cover paper from a bottom paper source and a stream of top cover paper from a top cover paper source.

11. The method of claim 10 wherein the step of continuously depositing the slurry comprises continuously depositing the slurry from the slurry source onto the stream of the bottom cover paper.

12. The method of claim 11 further comprising the step of directing the stream of top cover paper into place atop the slurry and the stream of bottom cover paper to form a wet wallboard.

13. The method of claim 12 wherein the step of positioning the at least one printing device comprises positioning the at least one printing device in between the bottom cover paper source and the slurry source so that the at least one printing device is aligned with the stream of bottom cover paper.

14. The method of claim 1, wherein each at least one printing device selectively ejects marking material onto the passing cover paper.

15. The method of claim 14, wherein each at least one printing device creates successive marks along the cover paper.

16. The method of claim 15 wherein the successive marks are four inches apart along the cover paper.

17. A method of manufacturing wallboard with markings thereon, the method comprising the steps of:

passing a stream of substantially horizontally oriented bottom cover paper from a bottom cover paper source by a slurry source;

continuously depositing a slurry from the slurry source onto the stream of bottom cover paper;

supplying a stream of top cover paper from a top cover paper source to a point where the top cover paper is placed on top of the slurry and bottom cover paper;

positioning a first at least one printing device on a horizontal element located in between the top cover paper source and the point where the top cover paper is placed on top of the slurry and the bottom cover paper, so that the first at least one printing device is aligned with the stream of top cover paper;

connecting a follower arm to the horizontal element;

coupling the follower arm to the cover paper;

utilizing the first at least one printing device to place marking material on the top cover paper to make markings on the cover paper in an organized fashion as the stream of top cover paper passes the first at least one printing device;

shifting the position of the follower arm to correspond to any horizontal shift in the top cover paper so that the follower arm causes an equal shift in the horizontal element and the at least one printing device as the top cover paper passes by the at least one printing device to keep the at least one printing device aligned with the top cover paper to make the markings in the organized fashion; and placing the stream of top cover paper on top of the slurry and the bottom cover paper to form a wet wallboard.

18. The method of claim 17 further comprising the step of positioning a second at least one printing device in between the bottom cover paper source and the slurry source so that the at least one printing device is aligned with the stream of bottom cover paper.

19. The method of claim 18 further comprising the step of utilizing the second at least one printing device to place marking material on the bottom cover paper in an organized fashion as the stream of bottom cover paper passes the second at least one printing device.

* * * * *